(12) United States Patent
Sebastian et al.

(10) Patent No.: US 10,836,124 B2
(45) Date of Patent: Nov. 17, 2020

(54) CONTINUOUS SHEET PRESS AND METHOD OF OPERATING SAME

(71) Applicant: Siempelkamp Maschinen- und Anlagenbau GmbH, Krefeld (DE)

(72) Inventors: Lothar Sebastian, Duisburg (DE); Klaus Schuermann, Juechen (DE); Michael Schoeler, Rheurdt (DE); Joerg Heinz Hueneke, Krefeld (DE); Horst Weiss, Wachtendonk (DE)

(73) Assignee: SIEMPELKAMP MASCHINEN-UND ANLAGENBAU GmbH, Krefeld (DE)

( * ) Notice: Subject to any disclaimer, the term of this patent is extended or adjusted under 35 U.S.C. 154(b) by 475 days.

(21) Appl. No.: 15/638,008

(22) Filed: Jun. 29, 2017

(65) Prior Publication Data
US 2018/0022045 A1 Jan. 25, 2018

(30) Foreign Application Priority Data
Jul. 19, 2016 (DE) .......................... 10 2016 113 315

(51) Int. Cl.
*B29C 63/02* (2006.01)
*B29C 70/50* (2006.01)
(Continued)

(52) U.S. Cl.
CPC ........ *B29C 70/508* (2013.01); *B29C 33/0038* (2013.01); *B29C 43/228* (2013.01); *B29C 43/265* (2013.01); *B29C 70/021* (2013.01); *B29C 70/504* (2013.01); *B30B 5/06* (2013.01); *B30B 5/062* (2013.01); *B29C 63/02* (2013.01); *B29C 63/22* (2013.01); *B32B 37/1027* (2013.01)

(58) Field of Classification Search
CPC ..... B29C 33/0038; B29C 43/228; B30B 5/06; B30B 5/062
USPC ........... 264/172.19, 316, 175; 277/345, 906; 100/151, 154
See application file for complete search history.

(56) References Cited

U.S. PATENT DOCUMENTS 3,988,098 A * 10/1976 Kato ..................... B29C 43/22
425/224
4,383,882 A 5/1983 Held
(Continued)

FOREIGN PATENT DOCUMENTS

DE      2000521 U    1/1970
DE      29622385 U    6/1997

*Primary Examiner* — Jeffrey M Wollschlager
*Assistant Examiner* — Xue H Liu
(74) *Attorney, Agent, or Firm* — Andrew Wilford

(57) ABSTRACT

A press for making a continuous sheet from composite material has upper and lower press belts having respective lower and upper reaches that vertically spacedly confront one another across a press gap having an upstream inlet end and a downstream outlet end, and that have transversely spaced outer edges extending in the direction. The belts are advanced direction and thereby draw a mat of the composite material in the inlet end, compress it into the sheet, and expelling the sheet from the downstream end. Two transversely spaced elastic seal strips extend in the direction in the gap and are each engaged between a respective one of the outer edges of the upper belt and the respective outer edge of the lower belt. Each belt has at each of the edges a surface in engagement with the respective edge strip and having an average peak-to-valley height of less than 1 μm.

14 Claims, 3 Drawing Sheets

(51) Int. Cl.
*B29C 33/00* (2006.01)
*B30B 5/06* (2006.01)
*B29C 43/22* (2006.01)
*B29C 43/26* (2006.01)
*B29C 70/02* (2006.01)
B29C 63/22 (2006.01)
B32B 37/10 (2006.01)

(56) References Cited

U.S. PATENT DOCUMENTS

| | | | |
|---|---|---|---|
| 4,670,080 A | 6/1987 | Schwarz | |
| 4,693,859 A * | 9/1987 | Held | B29C 33/02 |
| | | | 156/583.5 |
| 5,395,576 A | 3/1995 | Blauhut | |
| 5,827,460 A | 10/1998 | Brentrup | |
| 2015/0298491 A1 * | 10/2015 | Triepel | B41F 16/0026 |
| | | | 156/535 |

* cited by examiner

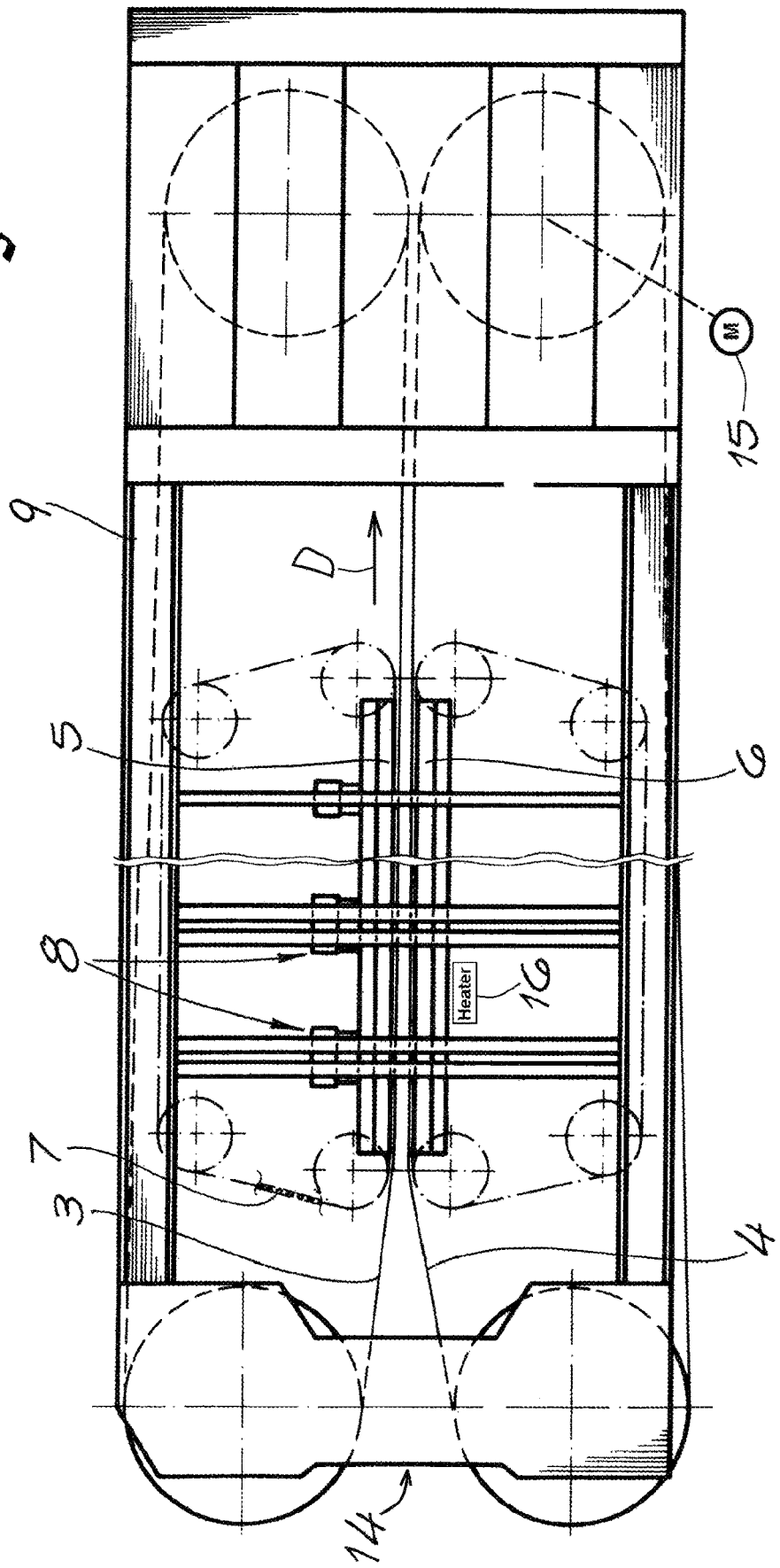

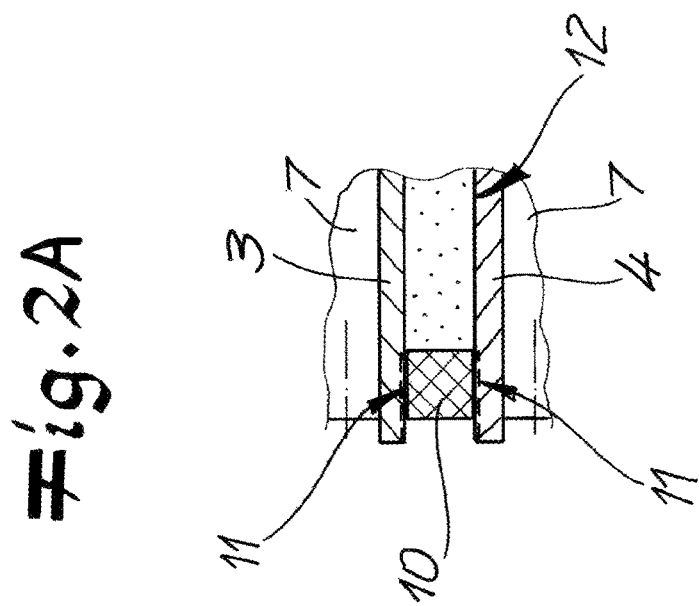
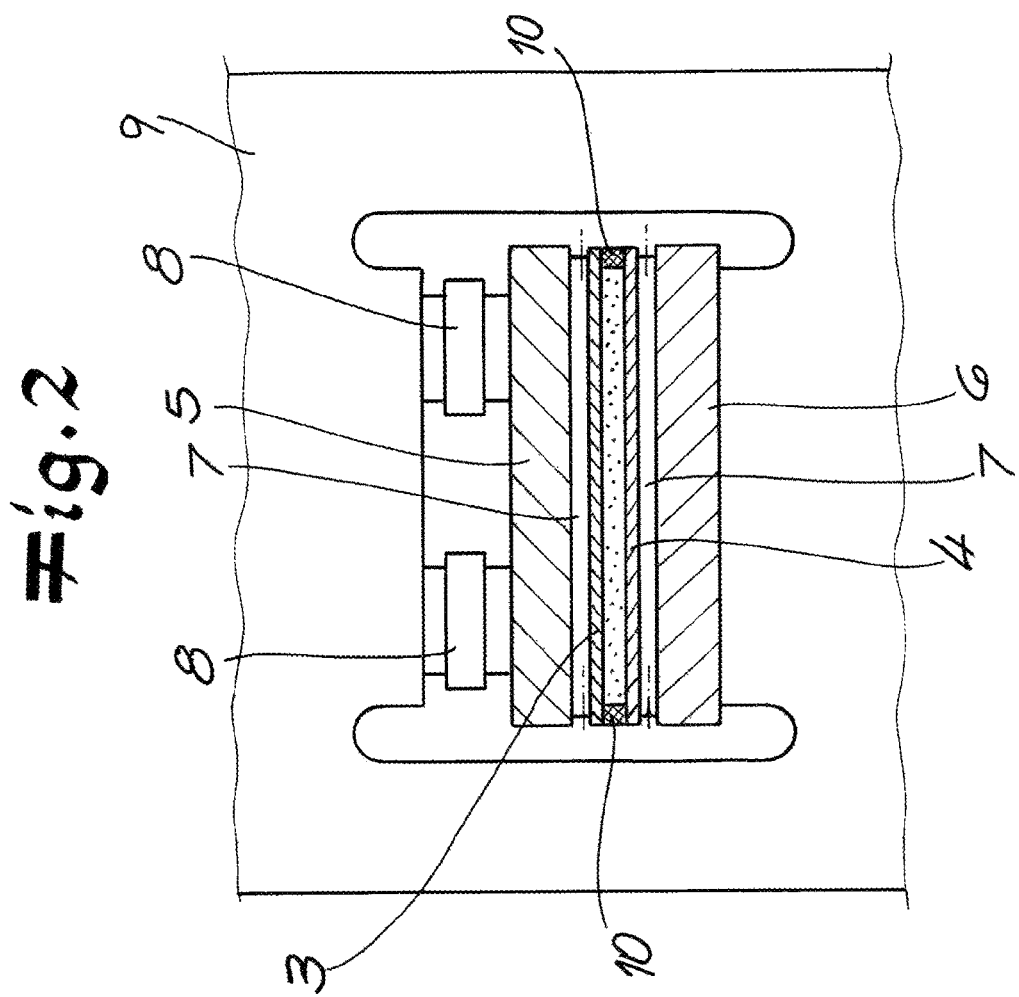

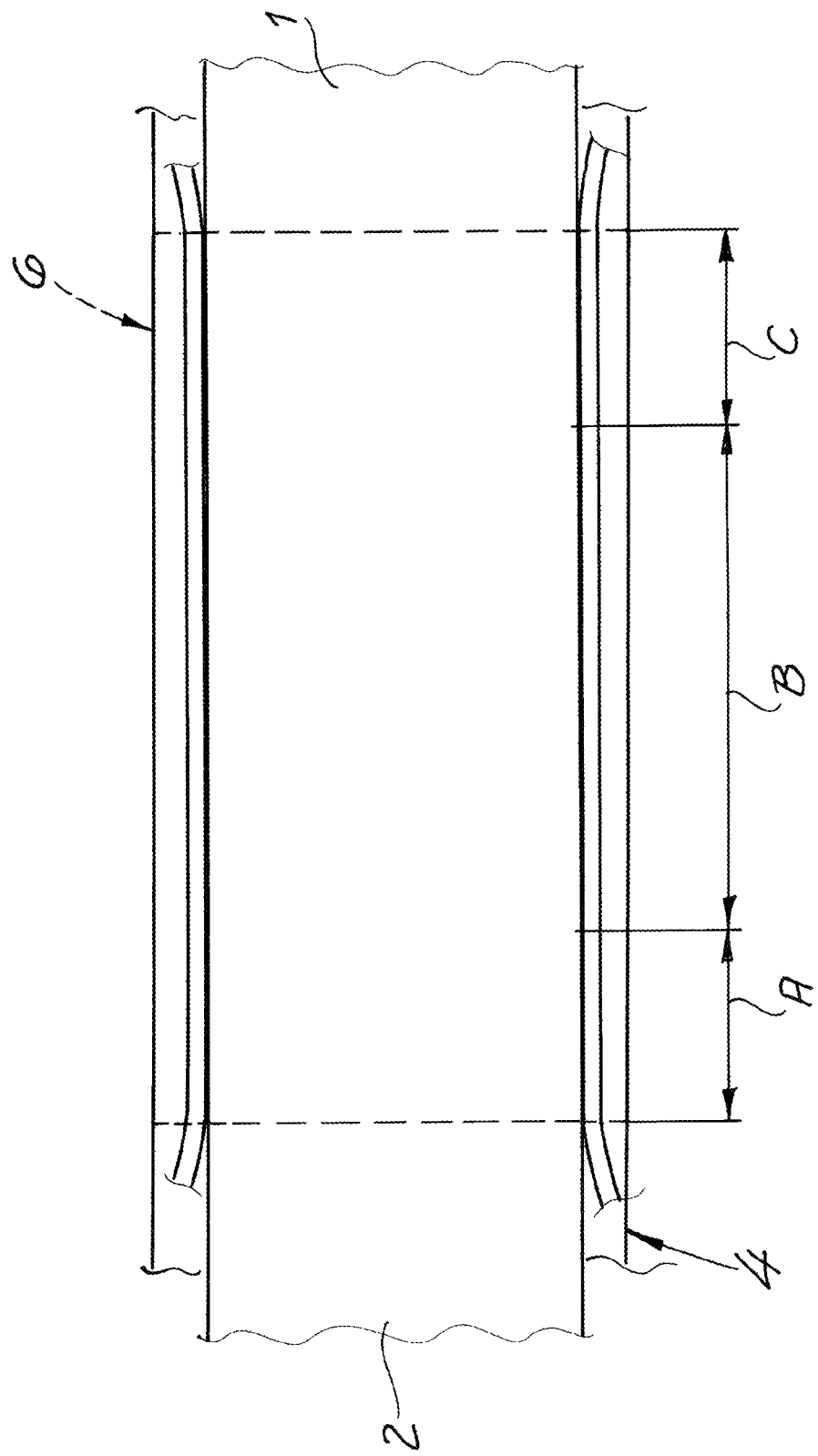

CONTINUOUS SHEET PRESS AND METHOD OF OPERATING SAME

FIELD OF THE INVENTION

The present invention relates to a press for continuously making composite sheet material. More particularly this invention concerns a continuous production method of making sheets of composite material.

BACKGROUND OF THE INVENTION

It is known to continuously manufacture sheet-type composite materials as a semifinished mat, in particular for pressing/consolidating semifinished sheet-molding-compound (SMC) mats in a continuous double-belt press. To do this, the double-belt press has an upper endless press belt of steel and a lower endless press belt also normally of steel. The semifinished mat is passed through a press gap formed by the press belts and is pressed (and therefore consolidated) there by applying pressure and optionally heat to form the composite material. This press gap is sealed at the sides by elastic seal strips placed between the press belts and mounted on the steel belts to move synchronously with them. The press belts are preferably designed as metal belts, especially preferably as steel belts.

Within the scope of the present invention, the term "semifinished mat" refers in particular to a preimpregnated (mat-type) semifinished fiber matrix product that is preferably made available as a roll product and is then pressed and consequently consolidated in a double-belt press to form a sheet of composite material. This is preferably a thermosetting plastic semifinished product, for example a semifinished SMC product. The fibers may be glass fibers or carbon fibers, for example. A (thermosetting) resin, for example a polyester resin (unsaturated) or an epoxy resin, may be used as the binder or matrix material. Furthermore, such a semifinished product often contains additional ingredients, in particular fillers, for example chalk. In one such semifinished mat, for example a semifinished SMC mat, the required components are consequently premixed for making the composite material and are therefore ready for processing so that the semifinished mat is pressed in the double-belt press using pressure and preferably heat to form the sheet material. In practice, SMC material is often produced in a continuous mold with a thickness of 2 mm, for example and then pressed in a single layer or multilayer condition.

It has been customary practice in the past to consolidate and subsequently to press such semifinished mats (for example semifinished SMC mats) in batch presses in finished-cut formats. Since the processing time in the press is relatively short due to the very short curing times, the "secondary times" have a relatively great effect in processing on batch presses. To prevent such cycle downtimes, the processing of composite material semifinished products in continuous presses has been proposed.

Thus, U.S. Pat. No. 5,827,460 for example describes a method of making fabric composite materials where a thermoplastic melt and a fiberglass mat or nonwoven are pressed together continuously in a double-belt press and the composite is cooled under pressure. The double-belt press is sealed at the sides by continuous belts made of rubber or plastic and provided with reinforcing inserts running along with the double-belt press. The lateral closure by the corotating belt has the effect that the impregnated fiberglass mat and/or the fiberglass nonwoven can flow outward only to a limited extent during the compaction step. If there is an increase in pressure due to an oversupply of melt or glass fibers in the event of a disturbance, the flexible belt guided by a friction-locking effect should yield to prevent damage to the semifinished product thus produced.

On the other hand, DE 296 22 385 proposes providing each steel belt at its longitudinal edges with a metallic layer that is raised with respect to the surface of the steel belt doing the pressing. This metallic layer forms a guide for the rubber elastic belts, so that yielding of the belts is prevented. The contact surface of the metallic layer should have a greater roughness than the pressing surface of the steel belts, so that even at a particularly high pressure in the pressing space, a sealing and also a further transport of the rubber elastic belt are ensured without any fear of a lateral migration of the belt. Laminates or polypropylene sheets should be produced in particular by using the double-belt press known from DE 296 22 385.

The use of double-belt presses in conjunction with the production of composite materials is also described in U.S. Pat. No. 5,395,576 and DE 2 000 521.

U.S. Pat. No. 4,383,882 describes a machine system for processing thermoplastic and thermosetting plastic films with and without a sealing operation and using a continuously operating press.

Finally, U.S. Pat. No. 4,670,080 relates to a method of continuous production of copper-laminated base material for circuit boards in a continuous double-belt press.

OBJECTS OF THE INVENTION

It is therefore an object of the present invention to provide an improved press for continuously making a sheet of composite material and a method of operating this press.

Another object is the provision of such an improved press and method that overcomes the above-given disadvantages, in particular that can make a sheet of composite materials economically from a semifinished mat of a high quality. In doing so, it should be possible in particular to ensure a reliable edge seal of the press gap of the double-belt press by using simple means.

SUMMARY OF THE INVENTION

A press for making a continuous sheet from composite material has according to the invention upper and lower press belts having respective lower and upper reaches that extend horizontally, that vertically spacedly confront one another across a press gap having an upstream inlet end and a downstream outlet end, and that have outer edges extending in the direction and spaced apart transversely to the direction. The belts are advanced the belts in a travel direction and thereby draw a mat of the composite material in the inlet end, compress it into the sheet, and expelling the sheet from the downstream end. Two elastic seal strips extend in but are spaced apart transversely to the direction in the gap and are each engaged between a respective one of the outer edges of the upper belt and the respective outer edge of the lower belt. Each of the belts has at each of the edges a surface in engagement with the respective edge strip and having an average peak-to-valley height of less than 1 µm, preferably less than 0.1 µm.

The invention teaches that, in a generic method of continuous production of sheet of composite materials from a semifinished mat, the press belts (for example steel belts) should have a structure-free and profile-free flat surface with an average peak-to-valley height Rz of less than 1 µm, for example at least at the edges where the seal strips are located. The average peak-to-valley height Rz of the press belts (for example steel belts) should preferably be less than 0.1 μm. Sheet of composite materials made of thermosetting semifinished products, preferably semifinished SMC products, should be produced by this method. Consequently, metal belts and especially preferably steel belts are used as the press belts.

The invention is based first on the discovery that a sheet of composite materials can be manufactured especially economically in a continuous process in a double-belt press because in this way it is possible to avoid cycle downtimes that occur in processing on batch presses. Furthermore, composite materials of different thicknesses can be produced on a double-belt press by variable adjustment of the press gap and without having to use different molding tools.

The invention is based on the discovery that it is expedient to seal the press gap laterally by elastic seal strips that are between the steel press belts at the edges of the press belts and are carried along with the mat and/or with the press belts by friction. The lateral sealing is particularly important because the semifinished material is heated during pressing, and consequently during its passage through the double-belt press, and is thereby softened and optionally even liquefied.

The invention has recognized here that it is not necessary to provide special raised formations and/or guides for the seal strips at the edges of the steel press belts because surprisingly without any guidance a satisfactory fixation of the lateral seals is achieved when the steel belts are designed in a structure-free and profile-free manner at the edges and are flat with a very low surface roughness. The press belts are especially preferably polished to a very smooth finish at the edges, namely to a so-called "optical quality" in the submicrometer range. This is because it has been found that the elastic seal strips, for example made of elastomeric silicone, adhere very strongly to such highly polished smooth surfaces, so that satisfactory guidance is possible even without special guides. On the whole, an excellent lateral seal is achieved even at high product pressures. On the whole, composite materials for example made of SMC semifinished products can be produced with a high quality in a particularly economical process. Special guide structures or the like can be omitted in the area of the press belts or other form-fitting guides, so it is fundamentally possible to fall back on traditional constructions of double-belt presses.

The structure-free and profile-free, flat and preferably polished surface with a minimal surface roughness in the submicrometer range at the edges of the steel press belts, where the seal strips are entrained, is especially important. It is fundamentally within the scope of the invention for the steel press belts to have such a high surface quality over their entire width. Consequently, if steel belts with polished surfaces of "optical quality" are used anyway, for example then it is possible to completely omit special measures at the edges.

Preferably, however, press belts (for example steel belts) for which the high surface quality is provided only at the edges, whereas a lower surface quality can be provided in the central region that represents the actual press region and that directly engages the composite material mat. The invention thus preferably proposes that the roughness of the steel belts is lower at the edges than in the central region engaging the composite material mat. Consequently, the belts need not be machined to a high quality over the entire surface, for example polished, but instead the belts are polished to a high quality only at the edges. This permits a particularly inexpensive production of the steel press belts. Thus, traditional steel press belts with a traditional surface quality, which are then preferably polished or otherwise machined to the corresponding quality only at the edges are used.

The elastic seal strips that are each guided on both sides in the composite material mat in the edge region by the press are preferably produced from elastomeric polymer and/or elastomeric plastic. Elastomeric silicone is especially preferably used. It has been found that such elastomeric silicone strips and/or silicone belts adhere excellently to the smooth surfaces of the steel belts described above so that a satisfactory edge seal is ensured. Moreover, elastomeric silicone belts or silicone strips are characterized by a high thermal stability. Thus, within the scope of the invention, elastic seal strips, for example made of silicone, which have thermal stability up to a temperature of 200° C., preferably up to a temperature of 250° C., especially preferably up to a temperature of 300° C., can be used within the scope of the invention.

Elastic seal strips that are guided over deflecting devices rotating continuously through the press are preferred—as is the case with the steel belts. Basically known proposals from the prior are may be used here.

The method according to the invention is preferably carried out in such a way that the pressure on the sealing belt and/or the sealing strip (during the entire passage through the press) is less than 10 N/cm$^2$. Furthermore, the method is preferably carried out in such a way that the sealing belt and/or the sealing strip is/are compressed by at most 10% inside the press (during the entire pressing operation), based on the thickness of the sealing strip. In this way, coordination with the product and its thickness is simplified. For example if a product 2 mm thick is to be produced, then a silicone tape with a thickness/height of 2.1 mm may be used to seal the product satisfactorily at the side. Consequently, in the unstressed state, the seal strips have a thickness/height greater than the thickness/height of the finished product.

According to another proposal of the invention, not only is a lateral seal over the edge strip ensured but also an intake end and outlet end seal of the press is ensured, namely due to the material itself. To do so, it is proposed that the semifinished mat will first pass through a first section, namely an inlet section in the continuous press (in the solid state) and, in doing so, will be at a relatively low first temperature. The press may be unheated in this area, for example. Following that, the semifinished mat passes through a second section in which the semifinished product is heated and therefore (the matrix material) is softened or liquefied. Then through a third section, the so-called consolidation section, in which the initially softened or liquid mat is converted back to the solid state and thereby consolidated, is connected to this second section. In this third section, the mat is again at a temperature lower than the second temperature in the second section. These measures ensure that the liquid material is sealed at the inlet end by the solid the mat at the inlet end. At the outlet end, the liquid material is sealed by the consolidated product itself, which is also solid. This eliminates special sealing measures in the inlet and outlet areas. The co-rotating seal strips at the side edges are responsible for the edge seal.

The first temperature in the first (inlet) section preferably amounts to less than 80° C., especially preferably less than 50° C. It is thus possible to operate the press in this range without heating. The length of the first section may be 0.5 m to 2 m, for example 1 m to 1.5 m.

In the second section the second temperature amounts to more than 120° C., for example preferably more than 150° C. The length of the second section may be 2 m to 6 m, for example 3 m to 5 m.

In the third section, the temperature amounts to less than 100° C., preferably less than 90° C. The temperature specifications preferably relate to the temperatures of the material to be pressed in the press gap that is heated by heating plates, for example.

Consequently, the processing in the press takes place not only by applying pressure but also by applying heat. Fundamentally, however, the invention also comprises embodiments in which processing takes place in the sense of a "cold pressing," i.e., with pressure alone but without the application of heat.

The rate of passage of the mat in the travel direction through the press amounts to 20 mm/s to 80 mm/s, for example preferably 35 mm/s to 70 mm/s.

It is within the scope of the invention to press a single layer of a semifinished mat, so that, for example sheets of composite workpieces with a thickness of about 2 mm are produced. Likewise multiple layers may be pressed together one above the other, for example up to five layers that are then pressed to form a product about 10 mm thick.

With the method according to the invention, thermosetting semifinished mats are preferably produced and especially preferably semifinished SMC mats are produced by pressing and consequently consolidating.

Alternatively, however, the invention also includes the processing of thermoplastic semifinished products and/or the production of thermoplastic products.

BRIEF DESCRIPTION OF THE DRAWING

The above and other objects, features, and advantages will become more readily apparent from the following description, reference being made to the accompanying drawing in which:

FIG. 1 is a side schematic view of a press for making plate-type composite materials from a semifinished mat;

FIG. 2 is a schematic end sectional view of the press;

FIG. 2A is a large-scale view of the detail indicated at IIA in FIG. 2; and

FIG. 3 is a schematic top view of the press illustrating the method of this invention.

SPECIFIC DESCRIPTION OF THE INVENTION

The drawing shows a press for making a continuous composite sheet 1 from a (thermosetting) semifinished mat 2, in particular for pressing and consequently consolidating semifinished SMC mats. The press is fundamentally designed as a double-belt press of generally standard design.

Such a double-belt press has a continuously rotating top steel belt 3 in the top part of the press in a design that is fundamentally known, and a continuously rotating bottom steel bent 4 in the bottom part of the press. Furthermore, a heatable top press platen 5 is provided in the top part of the press and a heatable bottom press platen 6 is provided in the bottom part of the press. The press belts 3 and 4 are braced respective upward and downward against the upper and lower press platens 5 and 6 via arrays of unillustrated roller rods 7 or bars. The press pressure is created by press actuators, for example hydraulic press cylinders 8 that are supported on a fixed press frame 9 and are effective on the top and/or the bottom press platen 5 or 6. Here the upper platen 5 is vertically movable by the cylinders 8 and the lower platen 6 is fixed in the stationary frame 9, although the opposite arrangement is within the scope of this invention. A motor illustrated schematically at 15 serves for advancing the lower stretch of the upper belt 3 and the upper stretch of the lower belt 6 in a horizontal travel direction D.

The semifinished mat 2 to be pressed passes through a horizontally throughgoing press gap 14 formed between the steel belts 3 and 4 and extending in the workpiece travel direction D. The semifinished mat 2 is thereby pressed and subsequently consolidated by applying pressure and preferably also heat to form the composite workpiece sheet 1. To this end the press has a heater shown schematically at 16 in FIG. 1.

The press gap is sealed laterally by elastic seal strips 10 provided between the steel belts 3 and 4 at parallel longitudinal outer edges 11 of the steel belts 3 and 4 and move with the mat 2 and with the steel belts 3 and 4. These elastic seal strips 10 can be manufactured from elastomeric silicone, for example and consequently may be embodied as silicone strips or silicone belts. This laterally seals the press gap 14, in particular taking into account the fact that the material to be pressed is soft and/or liquefied in the press and consequently at least at some paint in liquid form, so that escape of material past these lateral seal strips 10 can be prevented. According to the invention, the steel belts 3 and 4 have a structure-free and profile-free flat surface at these edges 11 where the strips 10 are mounted, the flat surface preferably having an average peak-to-valley height of less than 1 μm, especially preferably less than 0.1 μm. The edge strips 11 are consequently polished to a high gloss, so that they have a so-called "optical quality" (for example in the submicrometer range). This information also refers to the facing surfaces 12 of the steel belts 3 and 4 and consequently also to the confronting faces of the steel belts 3 and 4 between the edges 11.

However, in the embodiment shown here, the steel belts 3 and 4 do not have this highly polished flat surface over the entire surface area but only at the edges 11 described here. In the central region 12 where the belts 3 and 4 press directly against the composite material mat passing through the press gap 14, the steel belts 3 and 4 are not as flat and therefore have a greater surface roughness than at the edges 11. The surface quality of the steel belts 3 and 4 is based primarily on the requirements for making the product, so that the surface qualities depend primarily on the surface quality of the product to be achieved. According to the invention, however, especially high quality surfaces are required at the edges 11 because the elastic seal strips 10, for example silicone belts, surprisingly adhere especially well to such extremely smooth surfaces, so that no special guides are needed for the seal strips 10 at the edges 11.

Whereas the lateral sealing is effected by the seal strips 10 described here, sealing of the upstream input end and the downstream output end of the gap is done by the product itself. FIG. 3 shows how that the semifinished mat 2 first passes through a first upstream inlet section A at a low first temperature, so that the mat remains in the solid phase over a certain length in this inlet section A. This is then followed by the liquid phase in the second section B where the mat passes through a second section at a second temperature that is higher than the first temperature and in which the matrix material of the mat is liquefied. This is then followed by a third section C at a third temperature that is in turn lower than the second temperature, so that the material is converted back into the solid phase. Thus, at both the inlet and output ends the liquid phase is sealed by the product that is already consolidated.

The length of the first section A in the embodiment amounts for example to 1.5 m. The length of the second section B amounts for example to 4 m, and the length of the third section C to 1.5 m. Here, the first section A is unheated, while in the second section B, the temperature is set for example at 170° C. In a third section C, the temperature is for example 80° C., these specifications being based on the temperatures of the material to be pressed that is heated by the heating platens 5 and 6.

We claim:

1. A press for making a continuous sheet from composite material, the press comprising:
   upper and lower press belts each having respective lower and upper reaches that extend horizontally in a travel direction, that vertically spacedly confront one another across a press gap having an upstream inlet end and a downstream outlet end, and that have respective outer edges extending in the direction and spaced apart transversely to the direction with the outer edges of the upper belt being directly above the outer edges of the lower belt;
   means for advancing the belts in the travel direction and thereby drawing a mat of the composite material in the inlet end, compressing it into the sheet, and expelling the sheet from the downstream end; and
   two elastic seal strips extending in but spaced apart transversely to the direction in the gap and each engaged between a respective one of the outer edges of the upper belt and the respective confronting outer edge of the lower belt, each of the belts having at each of the respective outer edges a surface in engagement with the respective edge strip and having an average peak-to-valley height of less than 1 µm, each belt further having a central region between the respective outer-edge surfaces with a peak-to-valley height greater than that of the respective outer-edge surfaces.

2. A press for making a continuous sheet from composite material, the press comprising:
   upper and lower press belts each having respective lower and upper reaches that extend horizontally in a travel direction, that vertically spacedly confront one another across a press gap having an upstream inlet end and a downstream outlet end, and that have respective outer edges extending in the direction and spaced apart transversely to the direction with the outer edges of the upper belt being directly above the outer edges of the lower belt;
   means for advancing the belts in the travel direction and thereby drawing a mat of the composite material in the inlet end, compressing it into the sheet, and expelling the sheet from the downstream end; and
   two elastic seal strips extending in but spaced apart transversely to the direction in the gap and each engaged between a respective one of the outer edges of the upper belt and the respective confronting outer edge of the lower belt, each of the belts having at each of the outer edges a surface in engagement with the respective edge strip and having an average peak-to-valley height of less than 1 µm, a central region of each of the belts between the respective outer-edge surfaces having a peak-to-valley height greater than that of the outer edges of the respective belt.

3. The press defined in claim 2 wherein the peak-to-valley height is less than 0.1 µm at the outer edges.

4. The press defined in claim 3, wherein the surfaces of each of the outer edges with a peak-to-valley height of less than 1 µm have a width dimension measured perpendicular to the travel direction greater than a similarly measured width dimension of the respective strips.

5. The press defined in claim 2, wherein the elastic seal strips are elastomeric plastic and/or polymer.

6. The press defined in claim 5, wherein the elastic seal strips are of silicone.

7. The press defined in claim 2, wherein the seal strips are endless like the belts and each move synchronously with the belts in the gap.

8. The press defined in claim 2, further comprising:
   means for heating the composite material in the gap.

9. The press defined in claim 2, further comprising:
   means for maintaining the mat in a first upstream region of the gap immediately downstream of the inlet end and in a third downstream region of the gap immediately upstream of the outlet end at a low temperature below a melting point of a matrix material; and
   means for heating the mat in the gap in a second central region downstream of the upstream region and upstream of the downstream region to a temperature above a melting point of the matrix material such that the matrix material liquefies in the central region and leakage from the gap transverse to the direction is impeded by the seal strips.

10. The press defined in claim 9, wherein the first region is below 80° C., the second region is above 120° C., and the third region is below 100° C.

11. The press defined in claim 10, wherein the first region is below 50° C. and the second region is above 150° C.

12. The press defined in claim 9, where a length in the direction of the first region is 0.5 m to 2 m, a length in the direction of the second region 2 m to 6 m, and a length of the third region is 0.5 m to 2 m.

13. The press defined in claim 9, further comprising:
   means for compressing the strips in the gap between the belts with a pressure of less than 10 N/cm².

14. The press defined in claim 9, further comprising:
   means for compressing the strips in the gap between the belts by at most 10%.

* * * * *